(12) United States Patent
Zenere

(10) Patent No.: US 8,945,456 B2
(45) Date of Patent: Feb. 3, 2015

(54) STEREOLITHOGRAPHY MACHINE

(75) Inventor: Sergio Zenere, Carre' (IT)

(73) Assignee: DWS S.R.L., Venice (IT)

( * ) Notice: Subject to any disclaimer, the term of this patent is extended or adjusted under 35 U.S.C. 154(b) by 476 days.

(21) Appl. No.: 13/384,894

(22) PCT Filed: Aug. 3, 2010

(86) PCT No.: PCT/EP2010/061247
§ 371 (c)(1),
(2), (4) Date: Feb. 15, 2012

(87) PCT Pub. No.: WO2011/015566
PCT Pub. Date: Feb. 10, 2011

(65) Prior Publication Data
US 2012/0133083 A1 May 31, 2012

(30) Foreign Application Priority Data
Aug. 3, 2009 (IT) ................ VI2009A0207

(51) Int. Cl.
*B29C 35/08* (2006.01)
*B29C 41/02* (2006.01)
*B29C 67/00* (2006.01)

(52) U.S. Cl.
CPC ......... *B29C 67/0066* (2013.01); *B29C 67/0088* (2013.01); *B29C 67/0085* (2013.01)
USPC ........... 264/401; 264/402; 264/404; 425/143; 425/144; 425/174.4

(58) Field of Classification Search
CPC ............ B29C 67/0051; B29C 67/0055; B29C 67/0062; B29C 67/0066; B29C 67/0085; B29C 67/0088; B29C 67/0092
USPC ........ 264/40.1, 40.6, 401, 402, 404; 425/143, 425/144, 174.4, 375
See application file for complete search history.

(56) References Cited

U.S. PATENT DOCUMENTS

| | | | | |
|---|---|---|---|---|
| 4,229,242 A | * | 10/1980 | Otty ......................... | 264/40.6 X |
| 5,182,715 A | * | 1/1993 | Vorgitch et al. ........... | 264/401 X |
| 5,876,550 A | | 3/1999 | Feygin et al. | |
| 6,656,410 B2 | * | 12/2003 | Hull et al. ..................... | 264/401 |
| 7,604,768 B2 | * | 10/2009 | Kritchman .................... | 264/401 |
| 2009/0196946 A1 | * | 8/2009 | Kihara et al. ........... | 425/174.4 X |

FOREIGN PATENT DOCUMENTS

EP        1385055 A1     1/2004

* cited by examiner

*Primary Examiner* — Leo B Tentoni
(74) *Attorney, Agent, or Firm* — Husch Blackwell LLP; Edward D. Manzo

(57) ABSTRACT

The invention is a stereolithography machine (1) comprising the following: a support plate (2) provided with a hole (2*a*); a container (3) associated with the support plate (2) and comprising a transparent bottom (3*a*); a radiation source (4) arranged below the support plate (2) and suited to convey a radiation beam towards the transparent bottom (3*a*) through the hole (2*a*); a temperature control unit (5) suited to maintain the support plate (2) at a predetermined temperature.

13 Claims, 3 Drawing Sheets

STEREOLITHOGRAPHY MACHINE

FIELD OF THE INVENTION

The present invention concerns a stereolithography machine particularly suited to quickly prototype three-dimensional objects.

BACKGROUND OF THE INVENTION

A stereolithography machine of known type comprises a transparent container supported by a plate provided with a central opening, on the underside of which there is a light emitter.

The container contains a plastic resin that polymerizes and, therefore, solidifies, if exposed to the radiation emitted by said emitter that is preferably a laser emitter.

On top of the container there is a support element to which the three-dimensional object remains anchored during its formation.

As is known, the manufacturing process of the three-dimensional object takes place by selectively solidifying a thin layer of resin adjacent to the bottom of the container through the action of the laser beam that reaches said resin layer through the hole present in the plate and the transparent bottom.

The support element is successively lifted in order to detach the solidified layer from the bottom of the container, in order to allow other liquid resin to flow towards the bottom of the container.

The above mentioned operations are repeated for a plurality of successive layers, until completing the production of the three-dimensional object.

The applicant for the present patent has found out that the known machines of the type described above pose the drawback that they don't adapt to the use of the so-called "hybrid" resins, which contain various components of different types like, for example, a plastic component mixed with ceramics, wax or another non-plastic component.

Therefore, there is the inconvenience that the use of the above mentioned hybrid resins in the machines of known type negatively affects the quality of the objects obtained and increases the number of production rejects.

BRIEF SUMMARY OF THE INVENTION

The present invention intends to overcome the drawback of the known art as outlined above.

In particular, it is the object of the present invention to provide a stereolithography machine that comprises a radiation emitter arranged on the underside of the container and makes it possible to obtain optimal solidification results for any type of resin, including the so-called hybrid resins.

This object has been achieved by a stereolithography machine constructed according to the main claim.

After some practical tests, the applicant for the present invention has found that in the so-called hybrid resins, during use of the known stereolithography machine of the type described above, the different components separate and form agglomerates in the resin matrix, making it inhomogeneous and preventing its correct solidification.

The applicant has discovered that maintaining the resin at a suitable predetermined temperature it is possible to avoid the separation of the resin, at the same time maintaining it homogeneous and obtaining its optimal solidification.

In order to maintain said predetermined temperature, the stereolithography machine that is the subject of the invention comprises a device suited to control the temperature of the plate that supports the resin container.

To advantage, maintaining the plate at a predetermined temperature means maintaining also the container and therefore the resin contained therein at said predetermined temperature by heat conduction.

Further details of the stereolithography machine hat is the subject of the invention are described in the dependent claims.

BRIEF DESCRIPTION OF THE DRAWINGS

The said object and advantage, together with others which are highlighted below, will be illustrated in detail in the description of a preferred embodiment of the invention which is provided by way of non-limiting example with reference to the attached drawings, wherein.

DETAILED DESCRIPTION OF THE INVENTION

Figure 1:
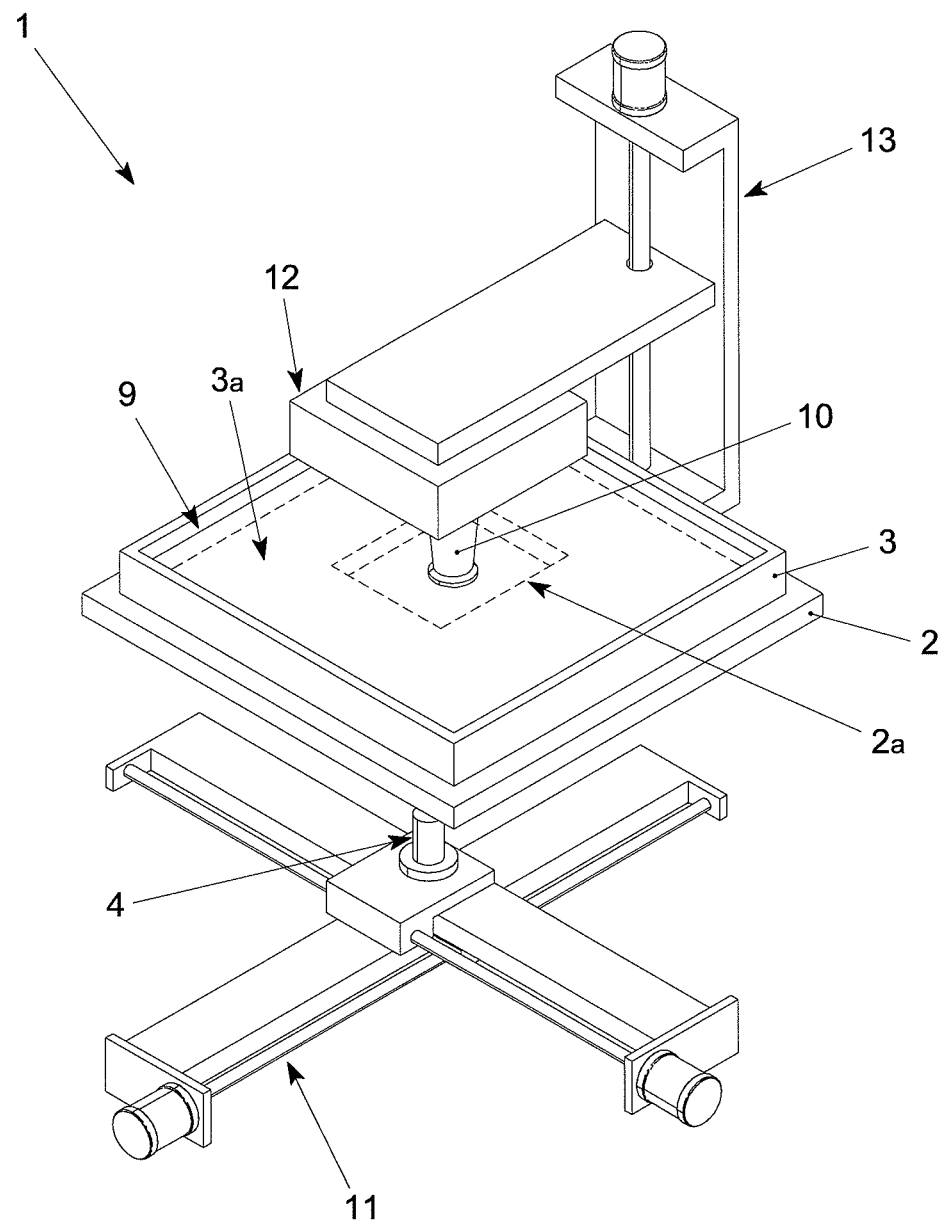
FIG. 1 shows an axonometric view of the stereolithography machine that is the subject of the invention.

The stereolithography machine of the invention, indicated as a whole by 1 in FIG. 1, comprises a support plate 2 associated with a container 3 suited to contain a liquid substance, in particular a liquid resin 9, and provided with a transparent bottom 3a.

Figure 2:
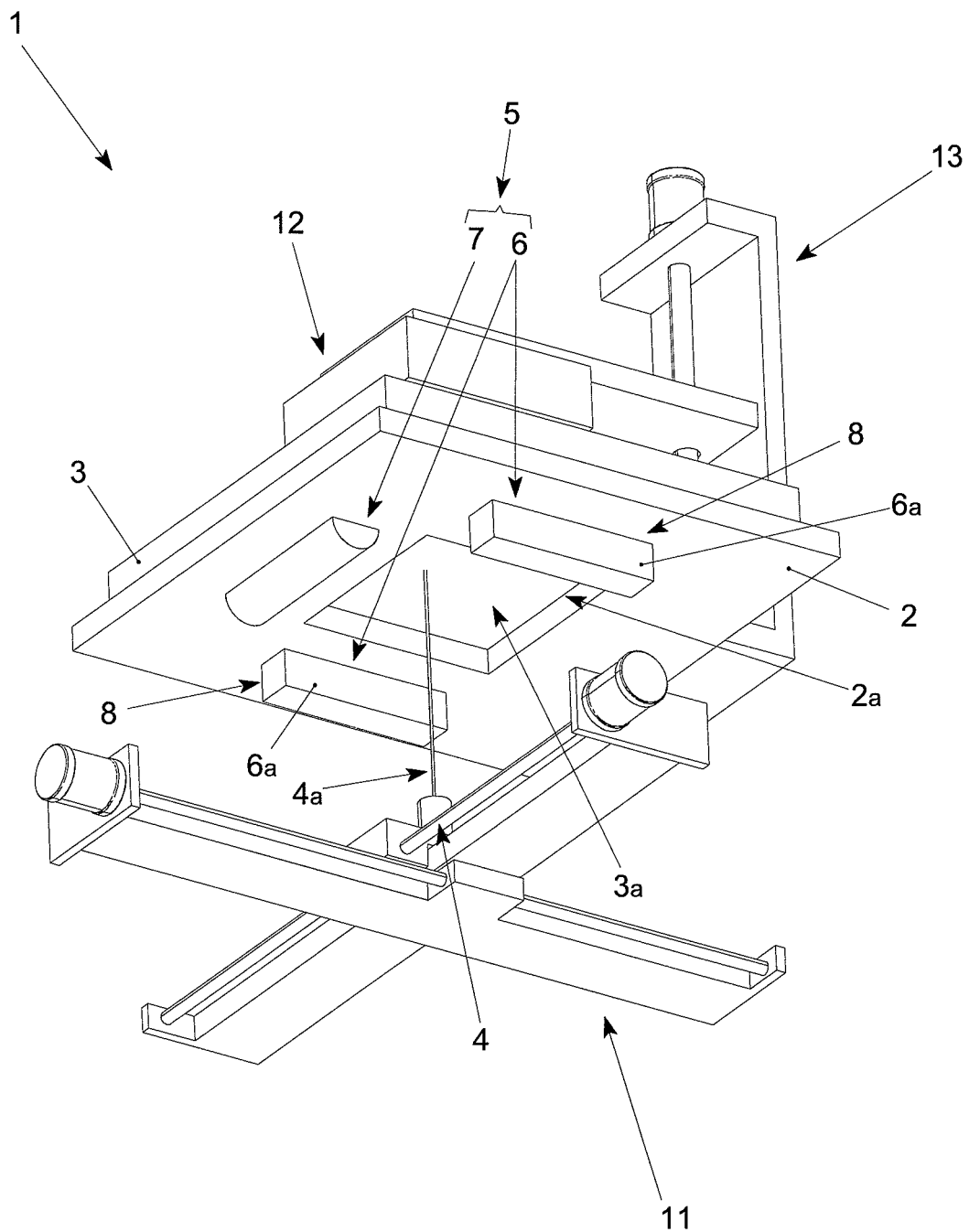
FIG. 2 shows an axonometric view of the machine of FIG. 1 from a different angle.

Furthermore, as shown in FIG. 2, there is a radiation source 4 arranged below the support plate 2, whose radiation is suited to solidify the resin 9 or another equivalent liquid substance.

The radiation source 4 conveys a radiation beam towards the container 3 through a hole 2a provided in the support plate 2, thus causing the solidification of the resin layer 9 adjacent to the bottom of the container 3.

The radiation source 4 preferably but not necessarily emits a laser beam 4a and is associated with an operating unit 11 suited to shift the point of incidence of the laser beam 4a on the container 3 with respect to two mutually orthogonal axes.

It is evident, on the other side, that in construction variants of the invention the radiation source 4 can be of any other known type, for example a mirror matrix to project a two-dimensional image on the container 3.

The three-dimensional object 10 being formed is supported by a support element 12 associated with moving means 13 in order to move the support element 12 in the vertical direction.

The components described above are supported by a frame resting on the ground, not illustrated in the drawings but known per se.

According to the invention, the stereolithography machine 1 comprises a temperature control unit 5, visible in FIG. 2, suited to maintain the support plate 2 at a predetermined temperature.

Heat conduction allows the plate 2 to maintain also the container 3 and therefore the resin 9 contained therein at the same predetermined temperature.

The above mentioned temperature can be chosen in such a way as to prevent the separation of the different components of the resin 9.

The control unit 5 is preferably configured so as to be able to maintain the plate 2 at any temperature chosen within a predefined interval, so that it is possible to set the conditions that are most suitable for the different types of resin.

The invention thus achieves the object to provide a stereolithography machine 1 that allows the use of any type of resin 9, without affecting the solidification process.

The temperature control unit 5 preferably comprises one pair of heating elements 6, thermally coupled with said support plate 2 in opposite positions with respect to the hole 2a.

To advantage, the two heating elements 6 ensure a homogeneous heat distribution on the entire plate 2 and therefore on the entire container 3.

It is therefore evident that in construction variants of the invention the number of heating elements 6 may also be only one or more than two, depending on the manufacturer's needs.

The temperature control unit 5 preferably comprises also a temperature sensor 7, thermally coupled with the plate 2.

The above mentioned temperature sensor 7 and the heating elements 6 are operatively connected to a control unit, not illustrated herein but known per se, suited to maintain the plate 2 at a constant temperature.

The temperature sensor 7 is preferably arranged in an intermediate position between the two heating elements 6, so as to measure the average temperature of the plate 2, thus enhancing adjustment precision.

Figure 3:
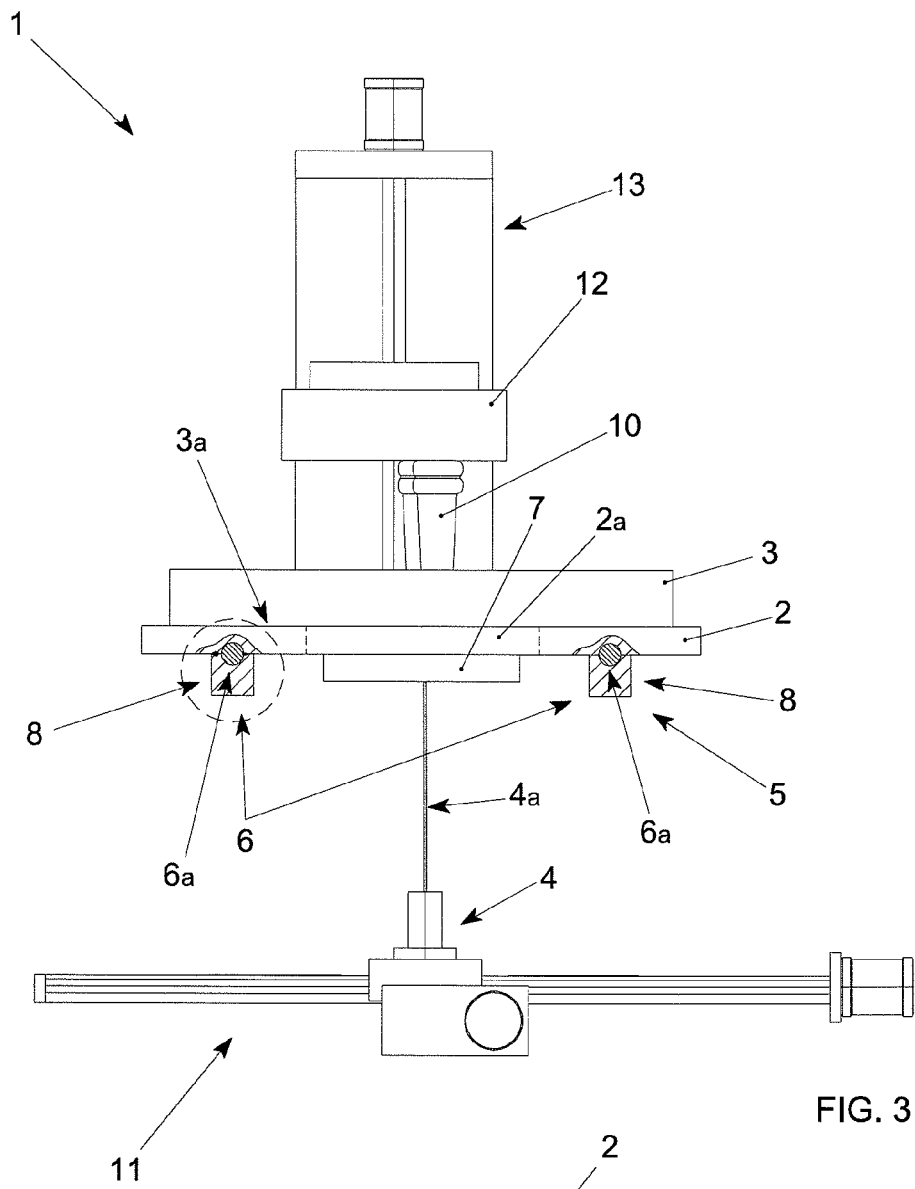
FIG. 3 shows a front view of a partial section of the machine shown in FIG. 1.

The heating elements 6 are preferably but not necessarily electric resistors 6a and are placed in contact with the plate 2, so as to obtain an optimal heat exchange, as shown in FIG. 3.

Said contact can preferably be made more effective by using a conductive paste that, advantageously, makes it possible to compensate for any contact imperfections between the heating element 6 and the plate 2.

Figure 4:
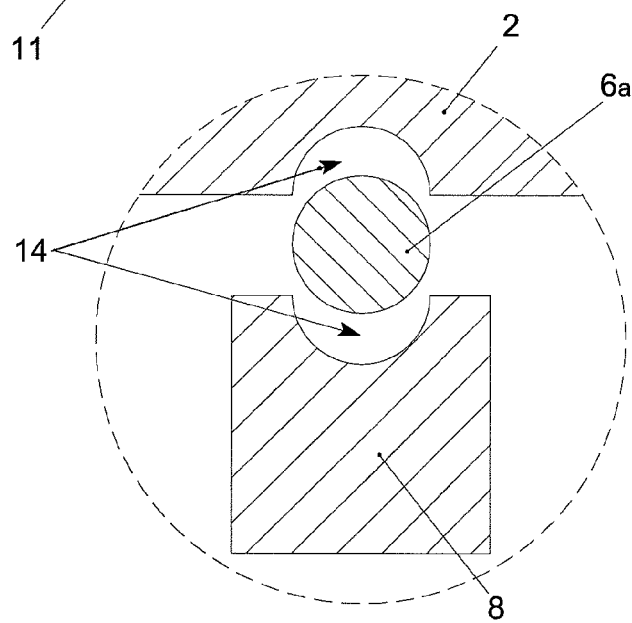
FIG. 4 shows a partially exploded detail of the machine shown in FIG. 3.

The heating element 6 is preferably housed in a recess 14 belonging to the plate 2, shown in the open condition in the detail of FIG. 4.

The above mentioned recess 14 is preferably provided with a cover 8, removably associated with the plate 2 in order to allow easy assembly and/or replacement of the heating element 6.

The material used for the support plate 2 is preferably aluminium or another material with similar mechanical resistance and heat conductivity.

Operatively, the container 3 is filled with the liquid resin 9, after which the three-dimensional object 10 is produced with the known method, according to the description given above.

However, differently from what happens in the machines of known type, according to the invention during the formation of the object 10 the temperature control unit 5 maintains the temperature of the plate 2 at a predetermined value.

The above mentioned predetermined temperature is selected according to the type of resin 9 used, so as to maintain the homogeneity necessary to guarantee its solidification.

The above dearly shows that the stereolithography machine described above achieves the set object.

In particular, the temperature control device allows the resin to be maintained in optimal conditions, avoiding the separation of its components and thus guaranteeing a correct solidification process.

During construction, the machine that is the subject of the invention may undergo changes that, though not illustrated in the drawings or described herein, shall nonetheless be covered by the present patent, provided that they come within the scope of the claims that follow.

The invention claimed is:

1. A stereolithography machine comprising:
   a container suited to contain a fluid substance, said container having a transparent bottom;
   a support plate provided with a hole, said support plate being designed to house said container so that said transparent bottom faces said hole;
   a radiation source arranged below said support plate, said radiation source suited to convey a radiation beam towards said transparent bottom through said hole; and
   a temperature control unit suited to maintain said support plate at a predetermined temperature,
   wherein said support plate at said predetermined temperature maintains said container and said fluid substance at said predetermined temperature.

2. The stereolithography machine according to claim 1, wherein said temperature control unit comprises at least one heating element thermally coupled with said support plate.

3. The stereolithography machine according to claim 2, wherein said temperature control unit comprises a temperature sensor thermally coupled with said support plate.

4. The stereolithography machine according to claim 3, wherein said heating element and said temperature sensor are operatively connected to a control unit suited to keep a temperature of said support plate at a constant value.

5. The stereolithography machine according to claim 2, wherein said heating element is an electric resistor.

6. The stereolithography machine according to claim 2, wherein said temperature control unit comprises two of said heating elements, thermally coupled with said support plate on opposite sides of said support plate with respect to said hole.

7. The stereolithography machine according to claim 2, wherein said heating element is arranged in contact with said support plate.

8. The stereolithography machine according to claim 2, wherein said support plate comprises a recess for housing said heating element.

9. The stereolithography machine according to claim 8, wherein said recess is provided with a cover removably mounted on said support plate.

10. The stereolithography machine according to claim 1, wherein said radiation beam is a laser beam.

11. A stereolithography method comprising the following operations:
   preparing a fluid substance suited to solidify when exposed to a predetermined radiation beam;
   preparing a container suited to contain said fluid substance, said container having a transparent bottom;
   filling said container with said fluid substance;
   housing said container in a support plate provided with a hole for the passage of said radiation beam so that the transparent bottom of said container faces said hole;
   conveying said radiation beam towards said transparent bottom through said hole;
   providing a temperature control unit;
   said temperature control unit heating said support plate to a predetermined temperature; and
   said support plate at said predetermined temperature heating said container and said fluid substance, to said predetermined temperature,
   wherein said fluid substance is a mixture of different components that tend to separate at room temperature, and
   wherein said predetermined temperature is suited to prevent said separation of said components.

12. The stereolithography machine according to claim 1, wherein said temperature control unit conducts heat to said support plate to maintain said support plate at said predetermined temperature.

13. The stereolithography machine according to claim 1, wherein said support plate conducts heat to said container and said fluid substance to maintain said container and said fluid substance at said predetermined temperature.

\* \* \* \* \*